US012070956B2

(12) United States Patent
Yamada et al.

(10) Patent No.: US 12,070,956 B2
(45) Date of Patent: Aug. 27, 2024

(54) LIQUID EJECTING HEAD AND LIQUID EJECTING APPARATUS

(71) Applicant: CANON KABUSHIKI KAISHA, Tokyo (JP)

(72) Inventors: Kazuhiro Yamada, Yokohama (JP); Toru Nakakubo, Kawasaki (JP); Yoshiyuki Nakagawa, Kawasaki (JP); Shingo Okushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 17/835,481

(22) Filed: Jun. 8, 2022

(65) Prior Publication Data

US 2022/0297442 A1 Sep. 22, 2022

Related U.S. Application Data

(62) Division of application No. 16/857,795, filed on Apr. 24, 2020, now Pat. No. 11,376,863, which is a (Continued)

(30) Foreign Application Priority Data

Jun. 29, 2017 (JP) ................................ 2017-127799

(51) Int. Cl.
*B41J 2/18* (2006.01)
*B41J 2/14* (2006.01)
(Continued)

(52) U.S. Cl.
CPC ............ *B41J 2/18* (2013.01); *B41J 2/14024* (2013.01); *B41J 2/14145* (2013.01);
(Continued)

(58) Field of Classification Search
CPC ...... B41J 2/18; B41J 2/14024; B41J 2/14145; B41J 2/17563; B41J 2/17596; B41J 2/19; B41J 2202/12
See application file for complete search history.

(56) References Cited

U.S. PATENT DOCUMENTS 6,412,926 B1 7/2002 Okuda
7,008,049 B2 3/2006 Katayama
(Continued)

FOREIGN PATENT DOCUMENTS

CN 1323259 A 11/2001
CN 1647924 A 8/2005
(Continued)

*Primary Examiner* — Geoffrey S Mruk
(74) *Attorney, Agent, or Firm* — Venable LLP

(57) ABSTRACT

A liquid ejecting head has a laminated flow path member on which a supply flow path for individually supplying a plurality of liquids to an element substrate and a collection flow path for individually collecting the liquids are formed. The supply flow path includes first and second common supply flow paths for horizontally leading first and second liquids to positions corresponding to a plurality of element substrates. The first and second common supply flow paths are formed in the same layer of the laminated flow path member. The collection flow path includes a first common collection flow path for horizontally collecting the first liquid and a second common collection flow path for horizontally collecting the second liquid from positions corresponding to the plurality of element substrates. The first and second common collection flow paths are formed in the same layer of the laminated flow path member.

11 Claims, 11 Drawing Sheets

Related U.S. Application Data division of application No. 15/976,470, filed on May 10, 2018, now Pat. No. 10,668,736.

(51) Int. Cl.
*B41J 2/175* (2006.01)
*B41J 2/19* (2006.01)

(52) U.S. Cl.
CPC ....... *B41J 2/17563* (2013.01); *B41J 2/17596* (2013.01); *B41J 2/19* (2013.01); *B41J 2202/12* (2013.01)

(56) References Cited

U.S. PATENT DOCUMENTS

| | | | |
|---|---|---|---|
| 8,517,518 | B2 * | 8/2013 | Kashu .................... B41J 2/1433 347/89 |
| 8,851,639 | B2 | 10/2014 | Arimoto |
| 9,248,647 | B2 | 2/2016 | Iwanaga et al. |
| 9,254,658 | B2 | 2/2016 | Yamada et al. |
| 9,452,606 | B2 | 9/2016 | Yamada |
| 9,469,111 | B2 | 10/2016 | Yamada et al. |
| 9,724,926 | B2 | 8/2017 | Keefe et al. |
| 9,931,845 | B2 | 4/2018 | Moriya et al. |
| 9,962,937 | B2 | 5/2018 | Okushima et al. |
| 10,300,707 | B2 | 5/2019 | Nakakubo et al. |
| 10,421,287 | B2 | 9/2019 | Yamazaki et al. |
| 10,668,736 | B2 | 6/2020 | Yamada et al. |
| 11,376,863 | B2 * | 7/2022 | Yamada ............... B41J 2/14145 |
| 2013/0021416 | A1 | 1/2013 | Yokoyama et al. |
| 2013/0169710 | A1 | 7/2013 | Keefe et al. |
| 2017/0197409 | A1 | 7/2017 | Okushima et al. |
| 2017/0197419 | A1 | 7/2017 | Okushima et al. |
| 2017/0197439 | A1 | 7/2017 | Okushima et al. |
| 2017/0232737 | A1 | 8/2017 | Komamiya et al. |
| 2017/0313088 | A1 | 11/2017 | Keefe et al. |
| 2017/0341398 | A1 | 11/2017 | Tamenaga et al. |
| 2018/0043688 | A1 | 2/2018 | Okushima et al. |
| 2018/0370230 | A1 | 12/2018 | Nakagawa et al. |
| 2019/0001692 | A1 | 1/2019 | Yamazaki et al. |

FOREIGN PATENT DOCUMENTS

| | | | |
|---|---|---|---|
| CN | 103241003 | A | 8/2013 |
| JP | 11-105293 | A | 4/1999 |
| JP | 2011-110851 | A | 6/2011 |
| JP | 2012-011671 | A | 1/2012 |
| JP | 2013-539724 | A | 10/2013 |
| JP | 2015-089624 | A | 5/2015 |
| JP | 5731657 | B2 | 6/2015 |
| JP | 2016-049700 | A | 4/2016 |

* cited by examiner

LIQUID EJECTING HEAD AND LIQUID EJECTING APPARATUS

BACKGROUND OF THE INVENTION

Field of the Invention

The present invention relates to a liquid ejecting head and a liquid ejecting apparatus.

Description of the Related Art

Recently, for a liquid ejecting head such as an inkjet print head, there is proposed a configuration of circulating liquid with an element substrate having ejecting elements arranged thereon to stabilize a liquid ejection state of the ejecting elements. Japanese Patent No. 5731657 discloses a configuration in which a plurality of types of liquids are supplied to the same element substrate through individual flow paths to perform an ejecting operation in accordance with ejection data by each of the ejecting elements, and liquid that has not been consumed in the ejecting operation is collected.

In a case where a plurality of types of liquids are ejected from the same element substrate, the flow paths for supplying/collecting liquids to/from the ejecting elements are arranged in different positions for each type of liquid. In this case, if the length or shape of the flow path, the height in a vertical direction in which the flow path is arranged, and the like are different for each type of liquid, the liquids may have different flow path resistances, causing variations in their ejection states, which makes it difficult for all types of liquids to have a common ejection design.

Providing regulators upstream and downstream of the element substrate as disclosed in Japanese Patent No. 5731657 may allow adjustment of a pressure in the flow path for each type of liquid. In this case, however, it is needed to prepare separate regulators for each liquid, which may cause increase in cost.

SUMMARY OF THE INVENTION

The present invention has been made to solve the above problem. Therefore, an object of the present invention is to have an equal flow path resistance among different liquids, in the configuration of supplying, ejecting, and collecting a plurality of types of liquids through individual flow paths using the same element substrate.

According to a first aspect of the present invention, there is provided a liquid ejecting head comprising: an element substrate having ejecting elements for ejecting a first liquid and ejecting elements for ejecting a second liquid arrayed thereon; and a laminated flow path member formed by laminating a plurality of layers, the laminated flow path member having a supply flow path for individually supplying the first liquid and the second liquid to the element substrate and a collection flow path for individually collecting the first liquid and the second liquid from the element substrate, wherein the supply flow path includes in part a first common supply flow path for leading the first liquid to positions corresponding to a plurality of the element substrates and a second common supply flow path for leading the second liquid to positions corresponding to the plurality of element substrates, the first common supply flow path and the second common supply flow path being formed in a same layer of the plurality of layers forming the laminated flow path member, and the collection flow path includes in part a first common collection flow path for horizontally collecting the first liquid from positions corresponding to the plurality of element substrates and a second common collection flow path for horizontally collecting the second liquid from positions corresponding to the plurality of element substrates, the first common collection flow path and the second common collection flow path being formed in a same layer of the plurality of layers forming the laminated flow path member.

According to a second aspect of the present invention, there is provided a liquid ejecting head comprising: first and second element substrates each having an ejection energy generating element for ejecting a first liquid and an ejection energy generating element for ejecting a second liquid; and a laminated flow path member having a supply flow path for supplying a liquid to the first and second element substrates and a collection flow path for collecting a liquid from the first and second element substrates, wherein the laminated flow path member includes a common supply flow path layer having a common supply flow path for supplying a liquid to the first and second element substrates and a common collection flow path layer having a common collection flow path for collecting a liquid from the first and second element substrates.

According to a third aspect of the present invention, there is provided a liquid ejecting apparatus comprising: a buffer tank for individually reserving a first liquid and a second liquid; a liquid ejecting head for ejecting the first liquid and the second liquid; a first circulation flow path for supplying the first liquid and the second liquid from the buffer tank to the liquid ejecting head; a second circulation flow path for collecting, into the buffer tank, the first liquid and the second liquid that have not been ejected from the liquid ejecting head; and a pump provided midstream in the second circulation flow path, for individually causing the first liquid and the second liquid to flow between the buffer tank and the liquid ejecting head, wherein the liquid ejecting head includes an element substrate having ejecting elements for ejecting the first liquid and ejecting elements for ejecting the second liquid arrayed thereon, a laminated flow path member formed by vertically laminating a plurality of layers each having a horizontal surface, the laminated flow path member having a supply flow path for individually supplying the first liquid and the second liquid to the element substrate and a collection flow path for individually collecting the first liquid and the second liquid from the element substrate, the supply flow path includes in part a first common supply flow path for horizontally leading the first liquid to positions corresponding to a plurality of the element substrates and a second common supply flow path for horizontally leading the second liquid to positions corresponding to the plurality of element substrates, the first common supply flow path and the second common supply flow path being formed in a same layer of the plurality of layers forming the laminated flow path member, and the collection flow path includes in part a first common collection flow path for horizontally collecting the first liquid from positions corresponding to the plurality of element substrates and a second common collection flow path for horizontally collecting the second liquid from positions corresponding to the plurality of element substrates, the first common collection flow path and the second common collection flow path being formed in a same layer of the plurality of layers forming the laminated flow path member.

Further features of the present invention will become apparent from the following description of exemplary embodiments with reference to the attached drawings.

DESCRIPTION OF THE EMBODIMENTS

With reference to the drawings, a liquid ejecting head and a liquid ejecting apparatus according to the embodiments of the present invention will be described. It should be noted that examples of the liquid ejecting head for ejecting liquid such as ink and the liquid ejecting apparatus having the liquid ejecting head according to the present invention include a printer, a copier, a facsimile machine having a communication system, and a word processor having a printer unit. Furthermore, the present invention may be applicable to a multifunction industrial printing apparatus combining various processing devices. For instance, the apparatus of the present invention may also be used for producing biochips, printing electronic circuits, producing semiconductor substrates, and the like.

First Embodiment

Figure 1A:
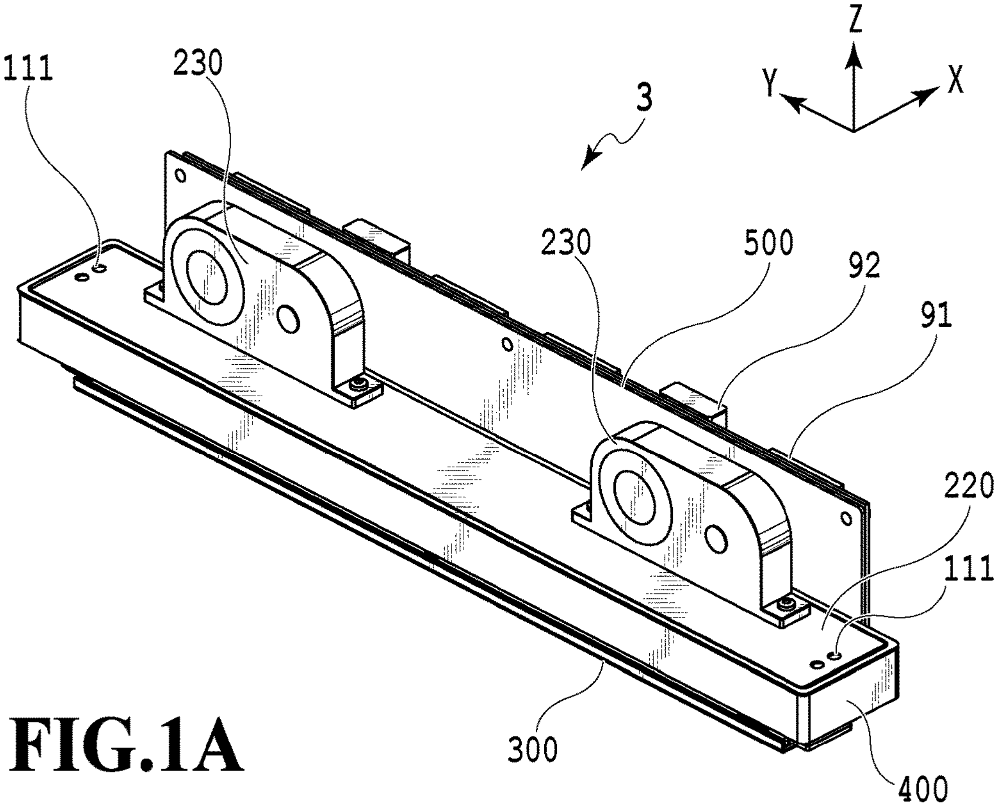
FIGS. 1A and 1B are a perspective view and a side view of a print head, respectively.
Figure 1B:
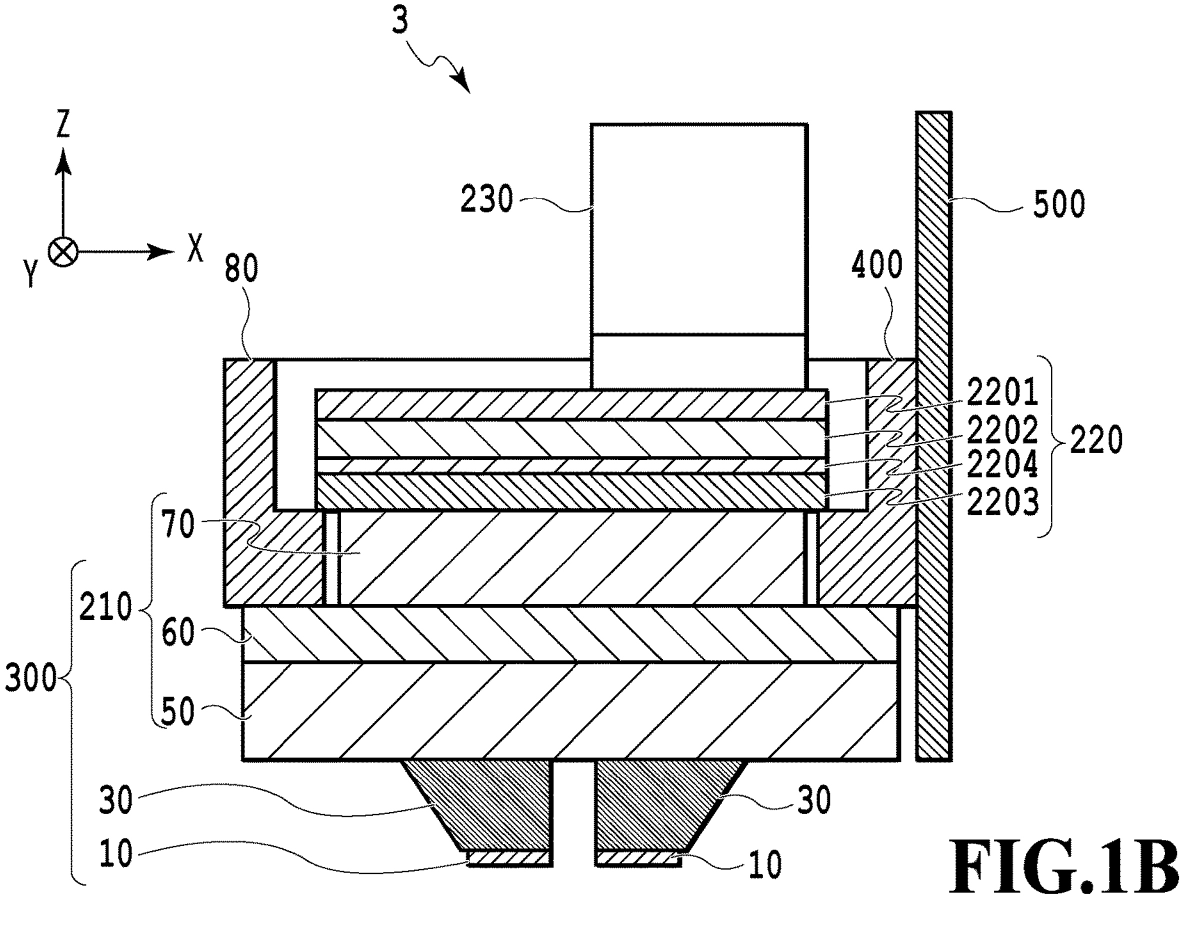

FIGS. 1A and 1B, respectively, are a perspective view and a side view of an inkjet print head (hereinafter simply referred to as a print head) that can be used as a liquid ejecting head of the present invention. A print head 3 is mainly composed of a liquid ejecting unit 300, a filter unit 220, and a negative pressure control unit 230 which are laminated in a Z direction (vertically upward) in this order in the figures. The liquid ejecting unit 300 and the filter unit 220 are supported by a supporting part 400, and an electrical wiring substrate 500 is attached to a side surface of the supporting part 400. The electrical wiring substrate 500 is a substrate for supplying ejection signals and power to the liquid ejecting unit 300, and has a signal input terminal 91 for receiving an ejection signal from a control unit of the apparatus body and a power supply terminal 92 for receiving power needed for ejecting operation from the apparatus body.

The liquid ejecting unit 300 has element substrates 10 having ejecting elements for ejecting ink arranged thereon, individual flow path members 30 for individually supplying a plurality of colors of inks to the element substrate 10, and a laminated flow path member 210 which connects the filter unit 220 and the individual flow path members 30 in a fluid manner (FIG. 1B). Each of the element substrates 10 is configured to eject two colors of inks. The individual flow path member 30 is prepared in a manner corresponding to each element substrate 10, and has a flow path for supplying ink to the element substrate 10 and a flow path for collecting ink that has not been ejected in the element substrate 10 for each ink color. The laminated flow path member 210 is prepared commonly for the plurality of individual flow path members 30 arranged in a Y direction, and has a flow path for supplying ink to the individual flow path member 30 and a flow path for collecting ink from the individual flow path member 30 for each ink color.

The filter unit 220 supplies ink flowing from a connecting part 111 to a negative pressure control unit 230 via a filter and supplies ink pressure-adjusted by the negative pressure control unit 230 to the liquid ejecting unit 300. Furthermore, the filter unit 220 sends ink collected from the liquid ejecting unit 300 to the negative pressure control unit 230 and discharges ink returning from the negative pressure control unit 230 through the connecting part 111.

The negative pressure control unit 230 has a pressure reducing regulator (H) for adjusting a pressure of ink before being supplied to the liquid ejecting unit 300 and a back pressure regulator (L) for adjusting a pressure of ink collected from the liquid ejecting unit 300.

The supporting part 400 supports the liquid ejecting unit 300, the laminated flow path member 210, and the electrical wiring substrate 500 and corrects warping of the laminated flow path member 210 with high precision to secure an accuracy of the position of the element substrate 10. Therefore, the supporting part 400 is preferably made of material having an adequate stiffness such as metal material including SUS or aluminum, ceramic material including alumina, and the like.

Figure 2:
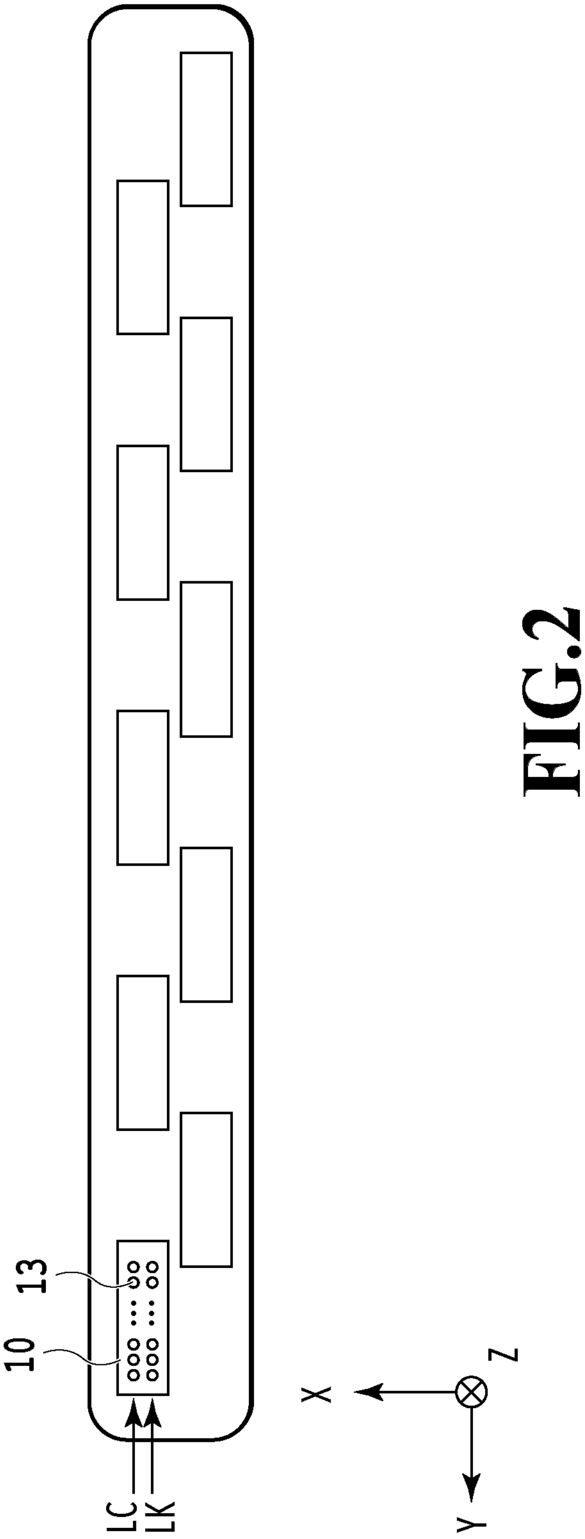
FIG. 2 illustrates a layout of a plurality of element substrates.

FIG. 2 illustrates a layout of the plurality of element substrates 10 in the liquid ejecting unit 300. In each of the element substrates 10, an ejection port array LK having ejection ports that eject black ink arranged in the Y direction and an ejection port array LC having ejection ports that eject cyan ink arranged in the Y direction are arrayed in parallel to each other in an X direction. The element substrates 10 are staggered relative to each other in the X direction and ten element substrates 10 are continuously arranged in the Y direction as shown in the figure, thereby achieving a printing width corresponding to A4 width in the Y direction. In this configuration, in response to an ejection signal supplied by the electrical wiring substrate 500, ink is ejected from each ejection port 13 in a −Z direction while conveying a print medium (not shown) in a +X direction at a predetermined speed, so that a desired image is printed on the print medium.

Figure 3:
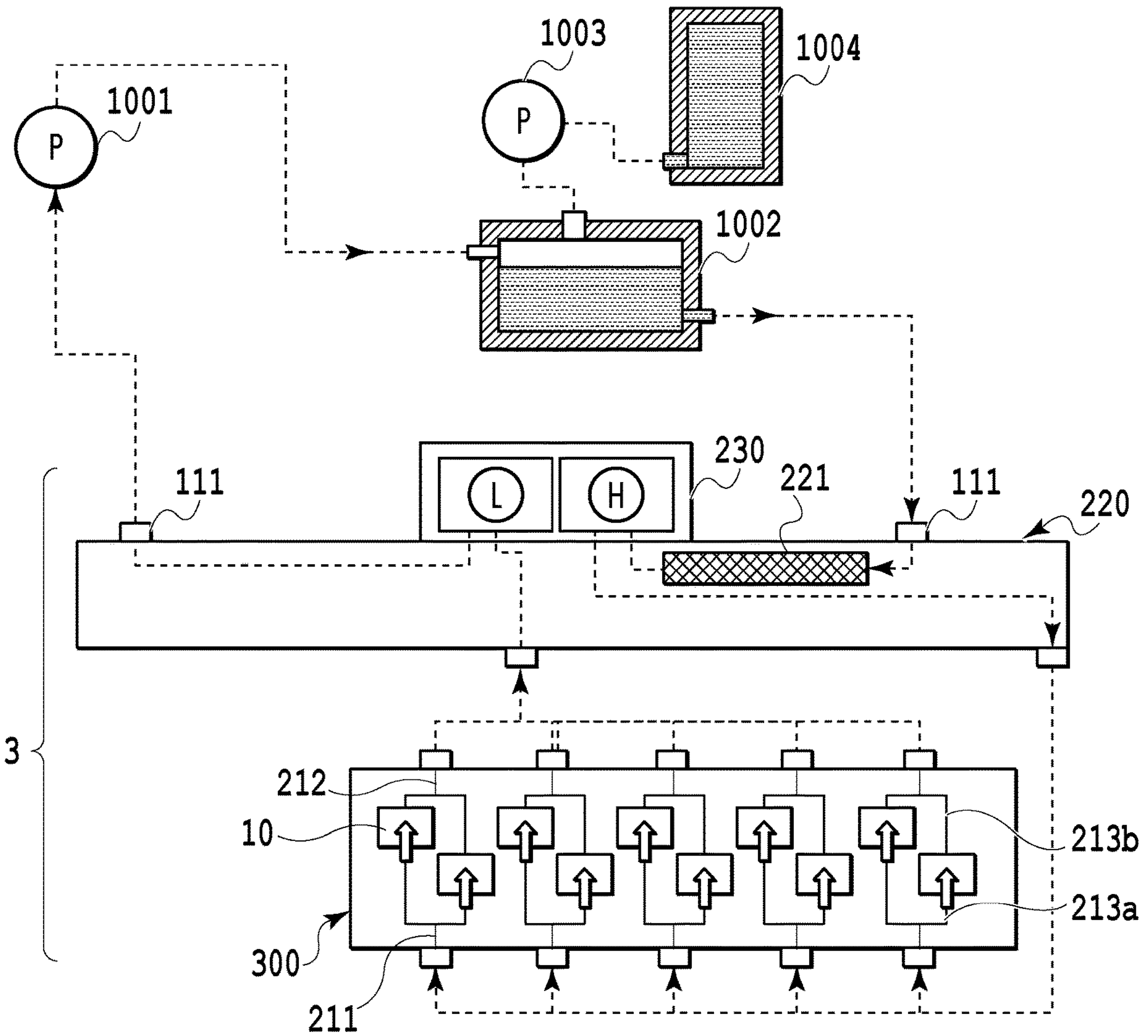
FIG. 3 is a schematic diagram of an ink circulation system.

FIG. 3 is a schematic diagram for explaining an ink circulation system in the inkjet printing apparatus using the print head 3 of the present embodiment. A buffer tank 1002 is a tank for reserving ink therein and for circulating the ink through the print head 3. On an upper wall of the buffer tank 1002, an atmosphere communication port (not shown) is provided to maintain an atmospheric pressure in the buffer tank 1002.

The buffer tank 1002 has a supply port for supplying ink to the filter unit 220 and a collection port for collecting the ink from the filter unit 220, each of which is connected to the connecting part 111 of the filter unit 220 by a tube. The collection port is disposed above a liquid level and the supply port is disposed below a liquid level, and even if the collected ink includes bubbles, the bubbles are removed in the buffer tank 1002 so that the ink supplied from the supply port includes no bubbles.

A circulation pump 1001 is provided midstream in a collection flow path between the buffer tank 1002 and the filter unit 220 to facilitate ink circulation in the entire circulation path.

In a case where an amount of ink in the buffer tank 1002 is equal to or less than a predetermined amount along with the ejecting operation of the print head 3 and the evaporation of the ink, a fill-in pump 1003 is driven to refill the buffer tank 1002 with ink contained in a main tank 1004.

Ink supplied from the buffer tank 1002 to the filter unit 220 through the connecting part 111 flows into the negative pressure control unit 230 after passing through a filter 221 provided inside the filter unit 220. The negative pressure control unit 230 is provided with a pressure reducing regulator H for adjusting a pressure to a relatively high pressure and a back pressure regulator L for adjusting a pressure to a relatively low pressure depending on a decompression level of the circulation pump 1001. Ink supplied from the filter unit 220 flows into the pressure reducing regulator H. Ink adjusted to have a relatively high pressure by the pressure reducing regulator H flows into a common supply flow path 211 of the liquid ejecting unit 300 via the filter unit 220. Meanwhile, in the negative pressure control unit 230, the back pressure regulator L for adjusting a pressure to a relatively low pressure is connected to a common collection flow path 212 of the liquid ejecting unit 300 via the filter unit 220. Providing the pressure reducing regulator H upstream of the liquid ejecting unit 300 and providing the back pressure regulator L downstream of the liquid ejecting unit 300 allow the pressure in the liquid ejecting unit 300 to be kept within a predetermined range irrespective of ejection frequency of the liquid ejecting unit 300. The detailed structure of the negative pressure control unit 230 will be described later.

In the liquid ejecting unit 300, ten element substrates 10 are staggered relative to each other as shown in FIG. 2. In the present embodiment, there are five common supply flow paths 211, each of which forms a flow path that commonly supplies ink to two of the element substrates. Also, there are five common collection flow paths 212, each of which forms a flow path that commonly collects ink from two of the element substrates. The common supply flow path 211 further branches into two individual supply flow paths 213*a*, each connecting to the element substrate 10. Ink flowing out of each element substrate 10 passes through an individual collection flow path 213*b*. Two individual collection flow paths 213*b* merge into one common collection flow path 212.

As already described above, the pressure reducing regulator H is connected upstream of the common supply flow path 211 and the back pressure regulator L is connected downstream of the common collection flow path 212. A pressure in the common supply flow path 211 is higher than a pressure in the common collection flow path 212. Accordingly, in the liquid ejecting unit 300, there is produced a flow of ink moving through the common supply flow path 211, the individual supply flow path 213*a*, the element substrate 10, the individual collection flow path 213*b*, and the common collection flow path 212 in this order.

The above-described ink circulation system shown in FIG. 3 is prepared for each color of ink. More specifically, housings such as the element substrate 10 and the filter unit 220 are commonly used for two colors, but flow paths and mechanisms respectively formed are prepared for each color of ink.

FIGS. 4A to 4E show part of the circulation system described with reference to FIG. 3, and are diagrams showing details of the laminated flow path member 210 for connecting the filter unit 220 and ten element substrates in a fluid manner. A path connecting the filter unit 220 and the individual supply flow path 213*a* and a path connecting the filter unit 220 and the individual collection flow path 213*b* as shown in FIG. 3 correspond to flow paths formed by the laminated flow path member 210.

As shown in FIG. 1B as well, the laminated flow path member 210 is formed by vertically laminating a third flow path member 50, a second flow path member 60, and a first flow path member 70 in this order, each of which having a substantially horizontal surface. Each of the members has ink flow paths as shown in FIGS. 4A to 4E.

Figures 4A, 4B, 4C, 4D, 4E:
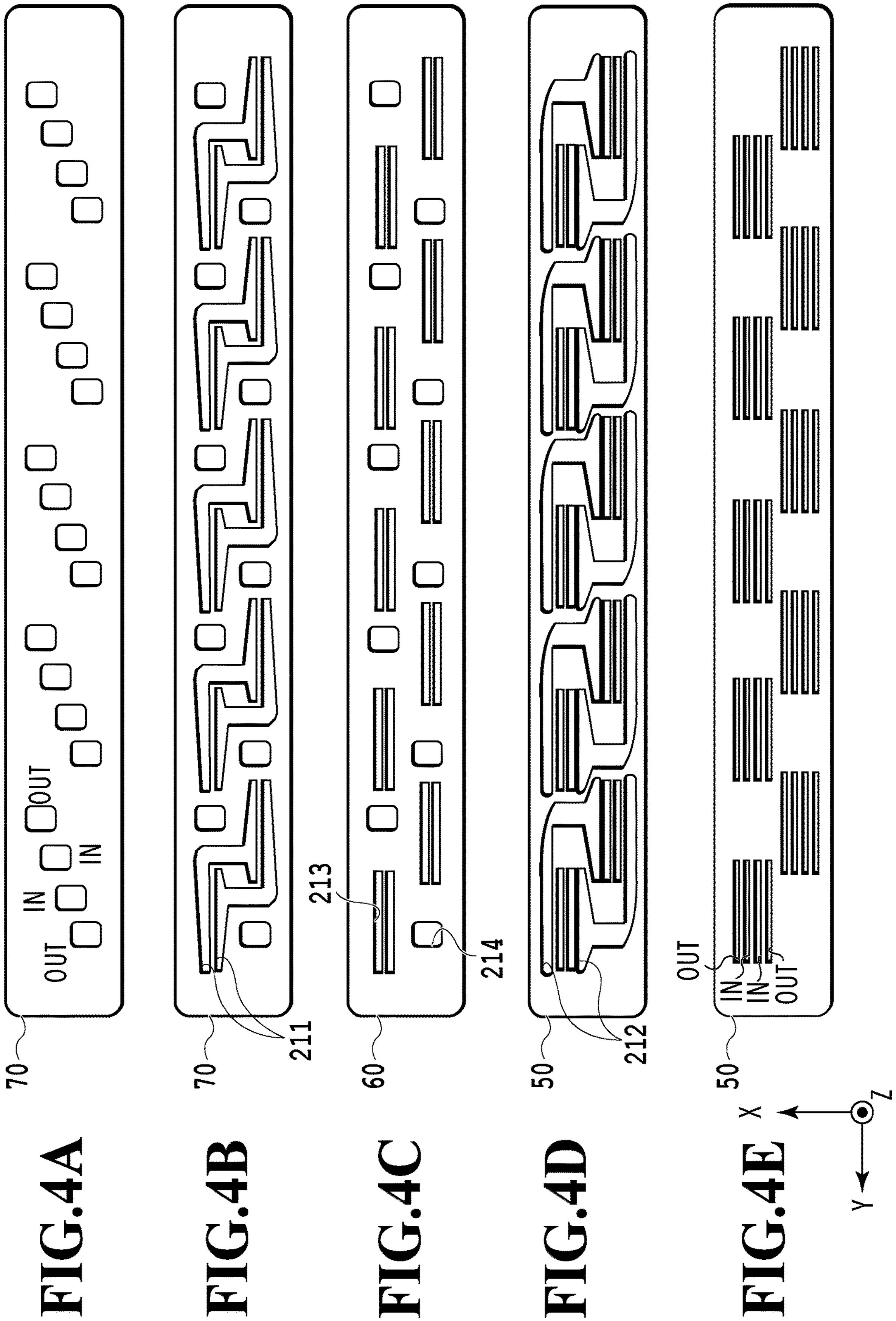
FIGS. 4A to 4E are diagrams showing details of a laminated flow path member used in a first embodiment.

FIG. 4A is a top view of the first flow path member 70 and FIG. 4B is a perspective view of a bottom surface of the first flow path member 70 as viewed from the top. FIG. 4C is a top view of the second flow path member 60. FIG. 4D is a top view of the third flow path member 50 and FIG. 4E is a perspective view of a bottom surface of the third flow path member 50 as viewed from the top. As for the second flow path member 60, a top surface and a bottom surface have the same shape, and therefore only the top view is shown. All of the members extend in the Y direction, and ten element substrates 10 cover the arrangement area shown in FIG. 3.

The top surface of the first flow path member 70 shown in FIG. 4A is a surface which comes into contact with the filter unit 220. A flow inlet (In) that receives ink from the filter unit 220 and a flow outlet (Out) which returns ink to the filter unit 220 are formed for each color of ink in a manner corresponding to openings of the filter unit 220.

On the bottom surface of the first flow path member (common supply flow path layer) 70 as shown in FIG. 4B, a first flow path groove 211 extending in an area corresponding to two element substrates 10 is formed for each color of ink. The first flow path groove 211 horizontally leads (spreads) ink flowing from the flow inlet (In) on the top surface in the area corresponding to two element substrates 10. In the present embodiment, all of the first flow path grooves 211 have a congruent shape and have an equal flow path resistance in all of five positions and colors arranged in the Y direction. In a case where the first flow path groove 211 of FIG. 4B circulates ink, it eventually serves as the common supply flow path 211 shown in FIG. 3.

The top surface of the second flow path member 60 shown in FIG. 4*C comes* into contact with the bottom surface of the first flow path member 70 shown in FIG. 4B and the bottom surface of the second flow path member 60 comes into contact with the top surface of the third flow path member 50 shown in FIG. 4D. The second flow path member 60 does not have a flow path groove that leads ink on X Y plane, but has a supply port 213 for supplying ink to the element substrate 10 and a collection port 214 for collecting ink from the element substrate 10, which are formed as through holes.

On the top surface of the third flow path member (common collection flow path layer) 50 shown in FIG. 4D, a second flow path groove 212 extending in the area corresponding to two element substrates 10 is formed for each color of ink. The second flow path groove 212 horizontally leads ink received from the flow outlet (Out) corresponding to two element substrates 10, formed on the bottom surface of the third flow path member 50, to the collection port 214 of the second flow path member 60. All of the second flow path grooves 212 have a congruent shape and have an equal flow path resistance like the first flow path grooves 211. In a case where the second flow path groove 212 of FIG. 4D circulates ink, it eventually serves as the common collection flow path 212 shown in FIG. 3. This configuration allows liquid in a pressure chamber to circulate through the outside of the pressure chamber.

The bottom surface of the third flow path member 50 shown in FIG. 4E is a surface which comes into contact with the individual flow path member 30 (FIG. 1B). A supply port (In) for supplying ink to the individual flow path member 30 and a collection port (Out) for collecting ink from the individual flow path member 30 are formed for each color of ink in positions corresponding to the openings provided on the individual flow path member 30. In the present embodiment, the supply ports (In) for two colors and the collection ports (Out) for two colors are axisymmetric in the X direction. More specifically, two collection ports (Out) for two colors are disposed so as to sandwich two supply ports (In) for two colors. In this configuration, ink heated on the element substrate 10 to a relatively high temperature flows in an outer position where heat dissipation is high, while ink having a relatively low temperature before being heated on the element substrate 10 flows in an inner position where heat dissipation is low. As a result, heat exchange takes place efficiently between adjacent flow paths, allowing temperature of ink flowing through the element substrate 10 to be kept within a predetermined range.

FIGS. 5A to 5G are diagrams showing details of the filter unit 220. The filter unit 220 is mounted vertically upward on the laminated flow path member 210 described with reference to FIGS. 4A to 4E and lies between the buffer tank 1002 and the liquid ejecting unit 300 to give and receive ink. The filter unit 220 is composed of, as shown in FIG. 1B, a lower layer portion 2203, a rubber sheet 2204, an intermediate layer portion 2202, and an upper layer portion 2201 which are vertically laminated in this order. Each of them has ink flow paths as shown in FIGS. 5A to 5G.

Figures 5A, 5B, 5C, 5D, 5E, 5F, 5G:
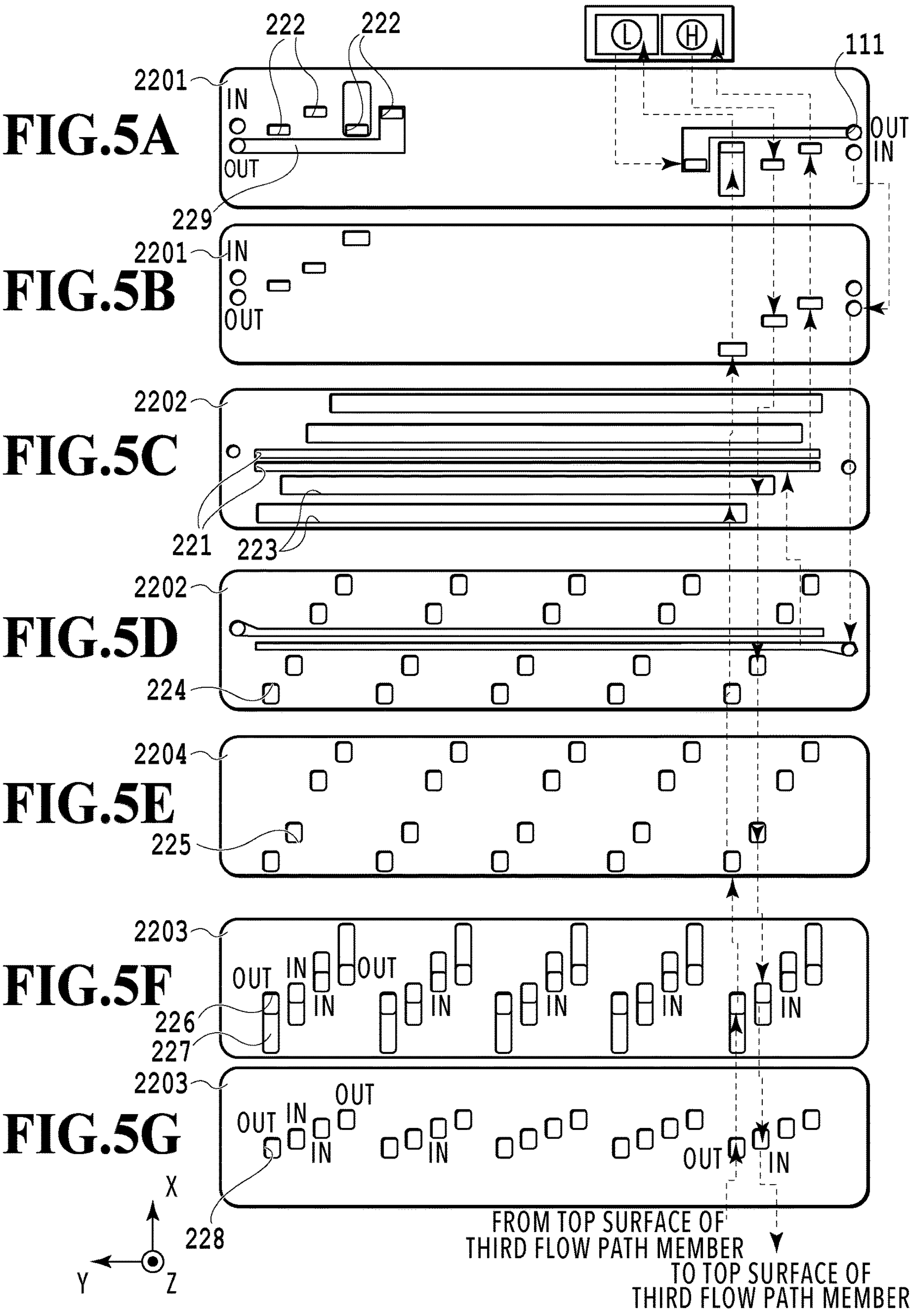
FIGS. 5A to 5G are diagrams showing details of a filter unit.

FIG. 5A is a top view of the upper layer portion 2201 and FIG. 5B is a perspective view of a bottom surface of the upper layer portion 2201 as viewed from the top. FIG. 5C is a top view of the intermediate layer portion 2202 and FIG. 5D is a perspective view of a bottom surface of the intermediate layer portion 2202 as viewed from the top. FIG. 5E is a top view of the rubber sheet 2204. FIG. 5F is a top view of the lower layer portion 2203 and FIG. 5G is a perspective view of a bottom surface of the lower layer portion 2203 as viewed from the top. As for the rubber sheet 2204, only a flow path port penetrating from a top surface to a bottom surface is formed, and the top surface and the bottom surface have the same shape, and therefore only the top view is shown. All of the members extend in the Y direction and ten element substrates 10 cover the arrangement area shown in FIG. 3.

At each end of the upper layer portion 2201 shown in FIGS. 5A and 5B, the connecting part 111 for giving/receiving ink to/from the buffer tank 1002 is provided, and an opening 222 for giving/receiving ink to/from the filter unit 220 is provided inside the connecting part 111. As for the connecting part 111, there are two connecting parts 111 for two colors: one for In and one for Out. As for the opening 222, there are four openings 222 for two colors: two openings 222 for In and Out of the pressure reducing regulator H and two openings 222 for In and Out of the back pressure regulator L. Furthermore, on the top surface of the upper layer portion 2201 shown in FIG. 5A, a flow path groove 229 that leads ink from the opening 222 to a predetermined position is formed as well.

On the top surface of the intermediate layer portion 2202 shown in FIG. 5C, two flow path grooves 223 connected to the openings 222 of the upper layer portion 2201 and extending in the Y direction are formed in a manner corresponding to In and Out for each color. Each of the flow path grooves 223 is connected to a plurality of connecting ports 224 formed on the bottom surface of the intermediate layer portion 2202 shown in FIG. 5D. Furthermore, on the intermediate layer portion 2202, the filter 221 for removing foreign matter is provided, through which ink received from the connecting part 111 corresponding to In of the upper layer portion 2201 passes. On the intermediate layer portion 2202, all of four flow path grooves 223 for two colors extending in the Y direction have the same length and width. All of the filters 221 for two colors also have the same length and width.

On the rubber sheet 2204 shown in FIG. 5E, a plurality of connecting ports 225 are formed in positions corresponding to the plurality of connecting ports 224 formed on the bottom surface of the intermediate layer portion 2202.

On the top surface of the lower layer portion 2203 shown in FIG. 5F, there are formed a connecting port 226 provided in a position corresponding to the connecting port 225 of the rubber sheet 2204, and a flow path groove 227 for connecting the connecting port 226 to an opening 228 provided on the bottom surface of the lower layer portion 2203 shown in FIG. 5G.

The bottom surface of the lower layer portion 2203 shown in FIG. 5G is a surface which comes into contact with the first flow path member 70 which is in the uppermost position of the laminated flow path member 210. The openings 228 are formed in the positions corresponding to the flow inlet (In) and the flow outlet (Out) of the first flow path member 70 shown in FIG. 4A.

In FIGS. 5A to 5G, the flow of ink in the above-described configuration is indicated by dashed arrows. Ink flowing from the connecting part 111 (In) shown in FIG. 5A goes down to the intermediate layer portion 2202 and after passing through the filter 221 of the intermediate layer portion 2202, it goes up again to the upper layer portion 2201 and flows into the pressure reducing regulator H via the opening 222. The ink pressure-adjusted by the pressure reducing regulator H reaches the intermediate layer portion 2202 via an opening 222 that is different from the preceding opening 222 and is spread across in the Y direction along the flow path groove 223. Then, the ink reaching the lower layer portion 2203 through the plurality of connecting ports 224 formed on a back surface of the intermediate layer portion 2202 and through the connecting ports 225 of the rubber sheet 2204, moves in the X direction along the flow path groove 227 formed on the top surface of the lower layer portion 2203. Then, the ink flows into the laminated flow path member 210 from the openings 228 formed on the bottom surface of the lower layer portion 2203.

Referring back to FIGS. 4A to 4E, ink flowing from the flow inlet (In) of the first flow path member 70 of the laminated flow path member 210 is spread across the area corresponding to two element substrates 10 through the common supply flow path 211 provided on the bottom surface of the first flow path member 70. Then, the ink reaches the third flow path member 50 via the supply port 213 of the second flow path member 60 and flows into the individual flow path member 30 from the supply port (In). Meanwhile, ink collected from the individual flow path member 30 and flowing from the supply port (Out) on the bottom surface of the third flow path member 50 is collected from the area corresponding to two element substrates 10 by the common collection flow path 212 formed on the top surface of the third flow path member 50. Then, the ink reaches the first flow path member 70 via the collection port 214 of the second flow path member 60. Then, the ink flows out of the flow outlet (Out) formed on the top surface of the first flow path member 70 to the filter unit 220. As shown in FIGS. 4B and 4D, the common supply flow path 211 and the common collection flow path 212 extend longitudinally along the element substrate 10.

Referring back to FIGS. 5A to 5G, ink collected from the laminated flow path member 210 moves along a path indicated by dashed arrows. That is, ink flowing from the opening 228 (Out) on the bottom surface of the lower layer portion 2203 shown in FIG. 5G moves in the X direction along the flow path groove 227 formed on the top surface of the lower layer portion 2203, and reaches the intermediate layer portion 2202 via the connecting port 225 of the rubber sheet 2204. Then, the ink is collected by the flow path groove 223 formed on the top surface of the intermediate layer portion 2202 and flows into the back pressure regulator L from the opening 222 formed on the top surface of the upper layer portion 2201. Ink pressure-adjusted by the back pressure regulator L returns to the upper layer portion 2201 via an opening 222 that is different from the preceding opening 222, and after being led by the flow path groove formed on the top surface of the upper layer portion 2201, the ink is discharged from the connecting part 111 (Out) to the outside of the print head 3 and goes toward the circulation pump 1001.

Figure 6:
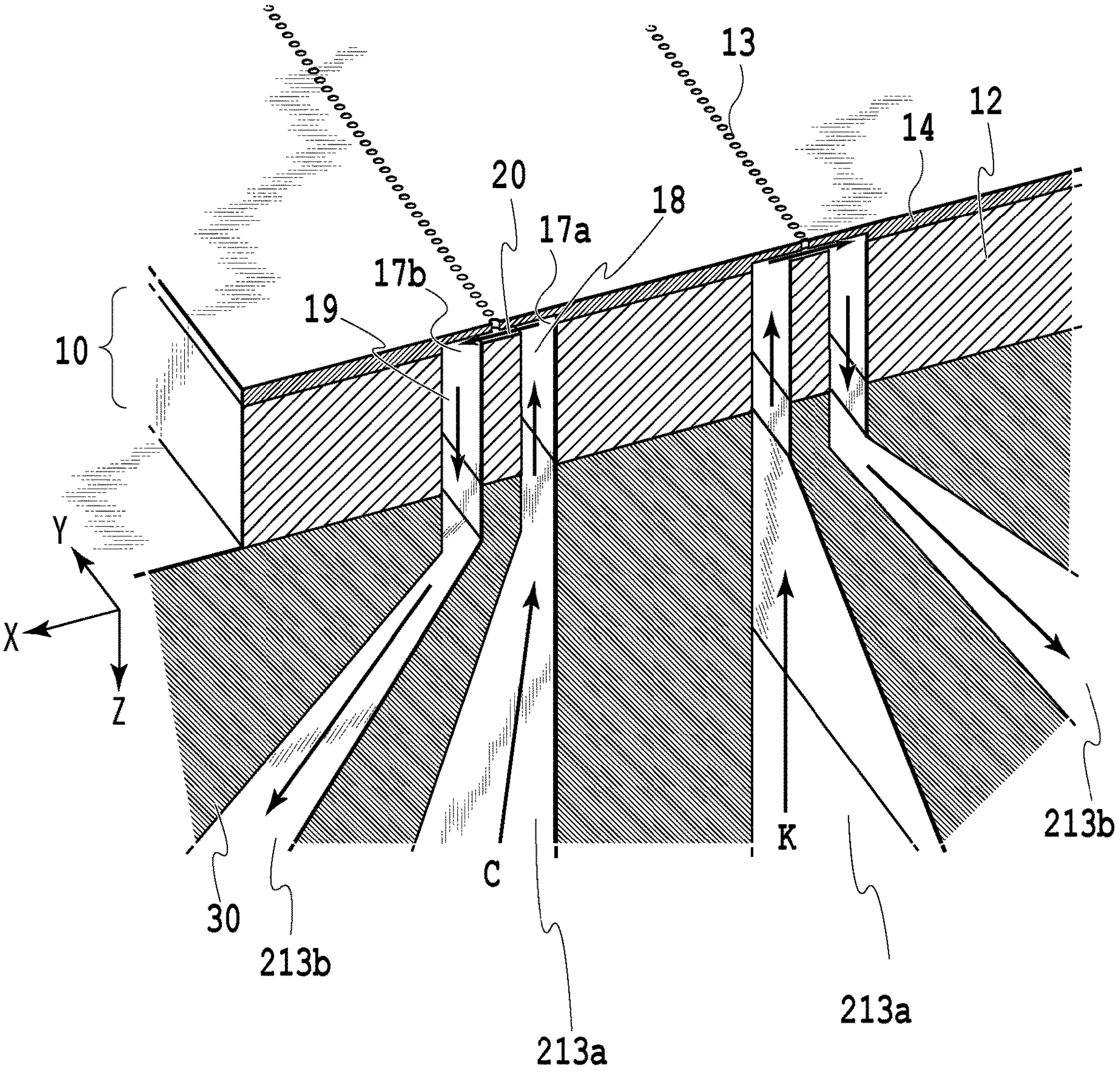
FIG. 6 is a cross-sectional view showing a structure of an element substrate and a connection state of an individual flow path member.

FIG. 6 is a cross-sectional view showing a structure of the element substrate 10 and a connection state of the individual flow path member 30. The print head 3 of the present embodiment uses an electrothermal transducer (heater) as an energy generating element for ejection. In this system, applying a voltage pulse across the electrothermal transducer (heater) causes film boiling in the ink contacting the heater, and the ink is ejected by a growing energy of generated bubbles.

The element substrate 10 is formed by laminating to a supporting substrate 12 on which heaters are formed at predetermined pitches, a flow path forming member 14 having ejection ports 13 that eject ink in a case where a voltage is applied across flow paths that lead ink to individual heaters and the heaters. In the present embodiment, an ejecting element refers to a set of a pressure chamber that contains ink, an electrothermal transducer (heater) which is an ejection energy generating element that applies energy to the ink contained in the pressure chamber, and an ejection port that ejects the ink to which the energy is applied. In the present embodiment, a circulation amount of ink is adjusted such that an amount of ink flowing in the pressure chamber in a unit time is less than a maximum amount of ink ejected from the ejection port.

In the element substrate 10, two ejecting element arrays each having a plurality of ejecting elements arrayed in the Y direction at predetermined intervals are arranged in parallel to each other in the X direction crossing the Y direction. One array is an ejecting element array for black ink and the other array is an ejecting element array for cyan ink.

In the supporting substrate 12, on both sides of each ejecting element array in the X direction, there are formed a substrate supply path 18 for commonly supplying ink to the plurality of ejecting elements and a substrate collection path 19 for commonly collecting ink in a manner penetrating in the Z direction and extending in the Y direction. The substrate supply path 18 is connected to the individual supply flow path **213*a* inside the individual flow path member 30 and the substrate collection path 19 is connected to the individual collection flow path 213*b* inside the individual flow path member 30**.

Although FIG. 6 shows only one individual supply flow path **213*a* and one individual collection flow path 213*b* for each color, the individual supply flow path 213*a* and the individual collection flow path 213*b* as described herein correspond to the individual supply flow paths 213*a* and the individual collection flow paths 213*b* shown in FIG. 3. Then, the other individual supply flow path 213*a* and the other individual collection flow path 213*b* branching from the same common supply flow path 211 and the same common collection flow path 212, respectively, are connected to the adjacent element substrate 10**.

The individual flow path member 30 of the present embodiment also serves to adjust variations in pitches between the flow paths of the laminated flow path member 210 and the flow paths of the element substrate 10. As shown in FIG. 1B, in the print head 3 of the present embodiment, the width of the element substrate 10 in the X direction is sufficiently smaller than the width of the laminated flow path member 210 in the X direction and also a distance (pitch) between flow paths is smaller. In the individual flow path member 30, the individual supply flow path **213*a* and the individual collection flow path 213*b* provided therein are inclined so as to lead the ink not only in the Z direction but also in the X direction and to connect in a fluid manner the laminated flow path member 210 and the element substrate 10** having different pitches between flow paths.

Meanwhile, in the flow path forming member 14, an element individual flow path 20 for connecting the substrate supply path 18 and the substrate collection path 19 in the X direction is formed in a manner corresponding to a heater. Then, in the midstream of the element individual flow path 20, an ejection port 13 is formed at a position opposite to the heater. For the flow path forming member 14, it is preferable to use a photosensitive resin member to form each ejection port and flow path by a photolithography process.

As already described above, the individual supply flow path **213*a* in the individual flow path member 30 is connected to the pressure reducing regulator H in the negative pressure control unit 230, while the individual collection flow path 213*b* in the individual flow path member 30 is connected to the back pressure regulator L in the negative pressure control unit 230. Accordingly, a predetermined pressure difference is generated between the individual supply flow path 213*a* and the individual collection flow path 213*b*, and in each element individual flow path 20, a flow from the substrate supply path 18 toward the substrate collection path 19 is produced. That is, since ink stably flows in each element individual flow path 20** irrespective of ejecting operation, it is possible to suppress increase in ink viscosity in the vicinity of an ejection port having a low ejection frequency and stagnation of bubbles in a specific location.

Figure 7A:
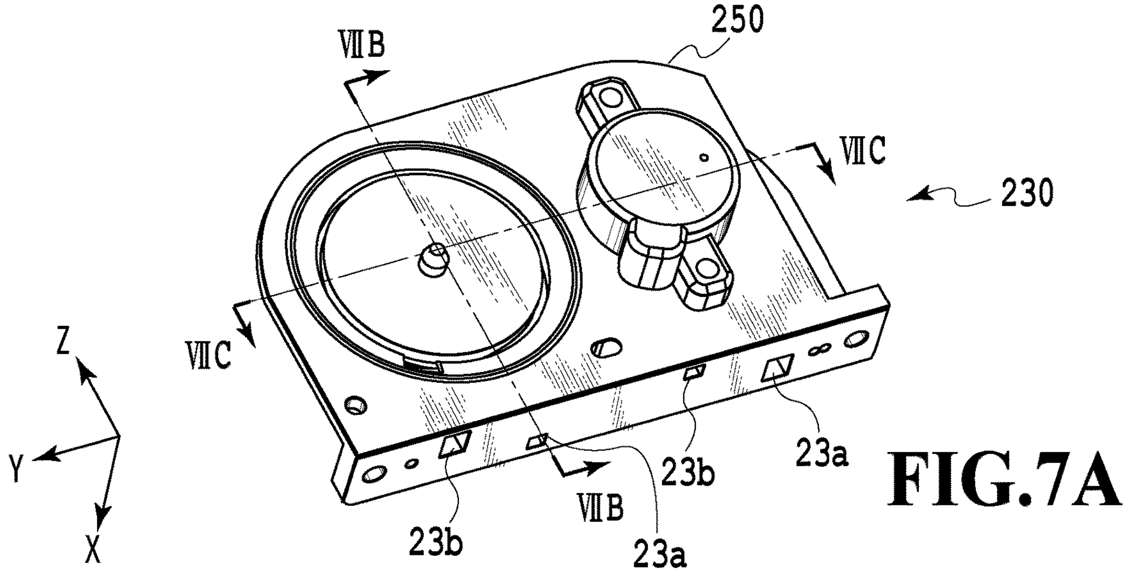
FIGS. 7A to 7C are views illustrating an internal configuration of a negative pressure control unit.
Figure 7B:
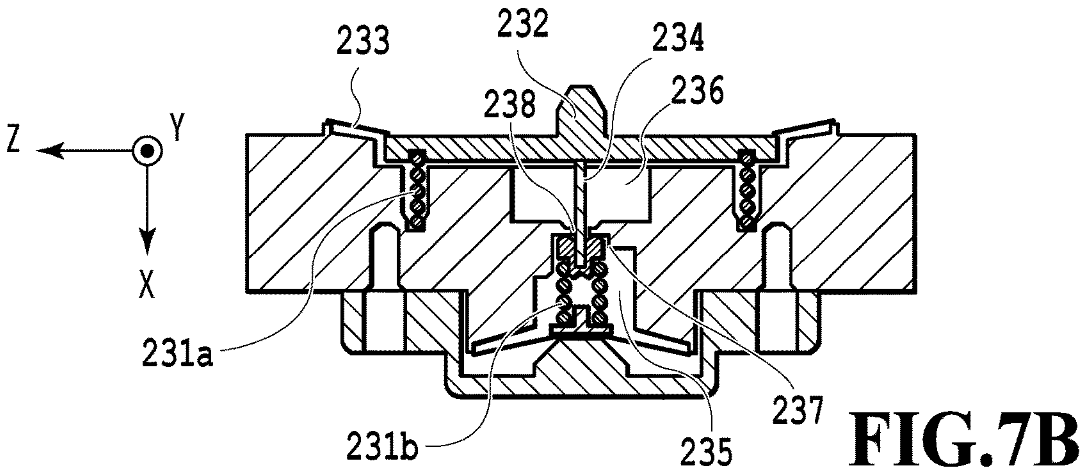
Figure 7C:
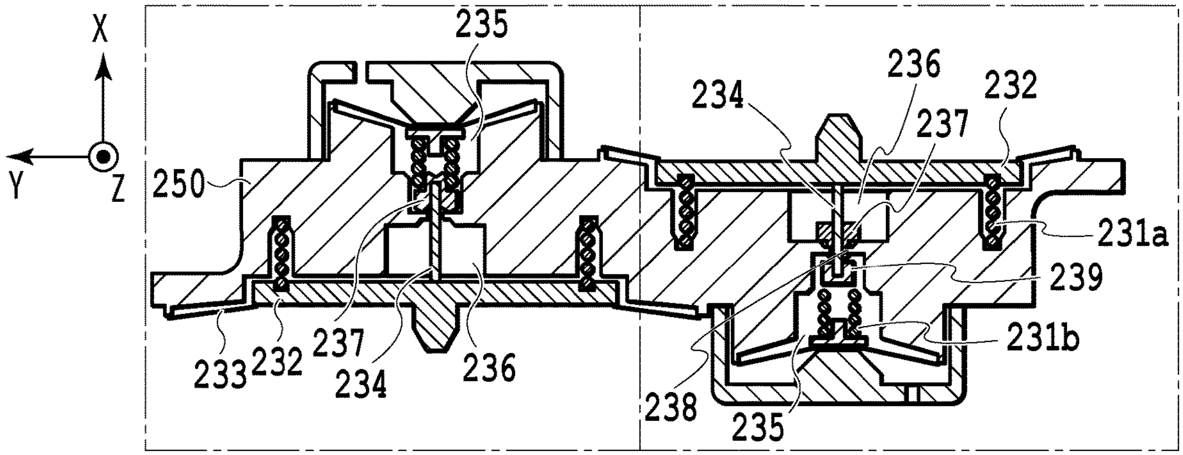

FIGS. 7A to 7C are views illustrating an internal configuration of the negative pressure control unit 230 corresponding to one color. FIG. 7A is a perspective view of the negative pressure control unit 230 and FIGS. 7B and 7C are cross-sectional views of the negative pressure control unit 230. As shown in FIGS. 7A and 7C, the negative pressure control unit 230 is provided with two regulators corresponding to the pressure reducing regulator H and the back pressure regulator L in a common body member 250 so as to be adjacent to each other in the Y direction and to face opposite in the X direction. The same type of negative pressure control unit 230 is provided for every color, and the negative pressure control unit 230 can be replaced by color for the filter unit 220. Also, the configuration of the pressure reducing regulator H and the configuration of the back pressure regulator L are basically the same. Hereinafter, the internal configuration of the pressure reducing regulator H will be described by way of example.

The pressure reducing regulator H has, as shown in FIG. 7B, a first chamber 235 and a second chamber 236 that communicate with each other via an orifice 238. The second chamber 236 is formed mainly by a cylindrical inner wall, a pressure-receiving plate 232, and a flexible film 233 surrounding the pressure-receiving plate. A coiled biasing member 231*a* is attached to the X direction side of the pressure-receiving plate 232, and the pressure-receiving plate 232 receives a biasing force in the −X direction by the biasing member 231*a*.

A valve 237 is attached to an end of a shaft 234 penetrating the orifice 238 in the +X direction in the first chamber 235 and is biased by the coiled biasing member 231*b* in a direction of closing the orifice (i.e., the −X direction). The valve 237 serves to control the opening and closing of the orifice and is preferably made of an elastic member such as rubber or an elastomer having a sufficient corrosion resistance to ink (liquid).

Meanwhile, an end of the shaft 234 in the −X direction comes into contact with the pressure-receiving plate 232 in the second chamber 236. That is, the shaft 234, the valve 237, and the pressure-receiving plate 232 are movable in the ±X direction while keeping an atmospheric pressure in balance with the biasing members 231*a* and 231*b*. In a case where an inner pressure of the second chamber 236 is lower than a set pressure, the pressure-receiving plate 232 moves in the ±X direction, separating the valve 237 from the orifice 238, thereby opening the orifice 238. This opening causes ink to flow from the first chamber 235 to the second chamber 236, and in a case where an inner pressure of the second chamber 236 exceeds a set pressure, the pressure-receiving plate 232 moves in the −X direction, bringing the valve 237 into contact with the orifice 238, thereby closing the orifice 238.

It should be noted that in a state where the printing apparatus is in a standby state and the circulation pump 1001 is suspended, it is preferable that the valve 237 be closed by coming into contact with the orifice 238. This is because in a state where the pressure reducing regulator H is sealed in a fluid manner, it is possible to generate a moderate negative pressure in the liquid ejecting unit 300 located downstream of the pressure reducing regulator H, keep a preferable meniscus in the vicinity of the ejection port, and prevent ink leakage and the like.

In the above-described configuration, ink flowing from the filter unit 220 into the first chamber 235 via an opening 23*a* enters the second chamber through the orifice 238 in a state where the valve 237 is open and returns to the filter unit 220 through an opening 23*b* of the second chamber 236.

Now, an atmospheric pressure is denoted by P0, an inner pressure of the first chamber 235 by P1, a pressure-receiving area of a pressure-receiving portion 248 by Sd, a pressure-receiving area of the valve 237 by Sv, a spring constant of the biasing members 231*a* and 231*b* by K, and a spring displacement of the biasing members 231*a* and 231*b* by x. From a balance of force on the pressure-receiving plate 232 in FIG. 7B, an inner pressure P2 of the second chamber 236 can be represented by Equation 1:

$$P2=P0-(P1\times Sv+K\times x)/Sd \qquad \text{(Equation 1)}$$

In Equation 1, the second term on the right-hand side is always a positive value. Therefore, P2 is stationarily lower than the atmospheric pressure and it is possible to keep a suitable meniscus in the ejection port of the liquid ejecting unit. Note that the inner pressure P2 of the second chamber 236 can be adjusted to a preferable negative pressure by changing the spring constant K or a free length of the biasing members 231*a* and 231*b*.

Meanwhile, a flow resistance between the valve 237 and the orifice 238 is denoted by R and a flow rate to the negative pressure control unit H is denoted by Q. From a pressure drop, an inner pressure P2 of the second chamber 236 can also be represented by Equation 2:

$$P2=P1-Q\times R \qquad \text{(Equation 2)}$$

Now, by using a distance between the valve 237 and the orifice 238 as a valve opening degree D representing a degree of the opening of the valve 237, as the valve opening degree D increases, the flow resistance R decreases. The relation between the flow resistance R and the valve opening degree D is generally shown in FIG. 8 as an example.

By settling into a valve opening degree D that satisfies both Equation 1 and Equation 2, the inner pressure P2 of the second chamber 236 is determined. This function allows P2 to be kept constant even if the flow rate changes. Hereinafter, the function will be described in detail.

For example, in a case where the flow rate Q to the pressure reducing regulator H increases, since a pressure in the buffer tank 1002 that communicates with atmosphere is constant, the flow resistance between the buffer tank 1002 and the pressure reducing regulator H increases and the inner pressure P1 of the first chamber 235 decreases. As a result, the inner pressure P2 of the second chamber 236 temporarily increases according to (Equation 1).

Figure 8:
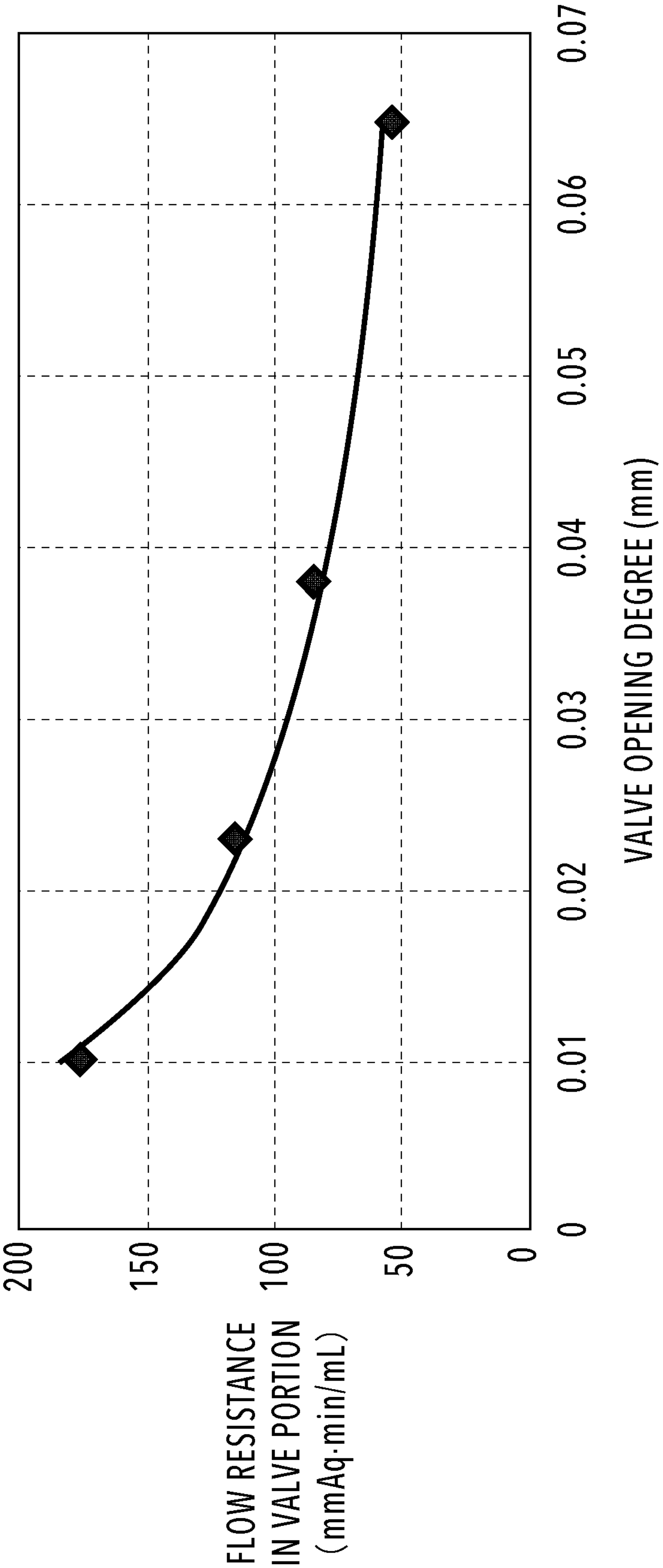
FIG. 8 is a graph showing a relation between a flow resistance and a valve opening degree.

In a case where the flow rate Q and the inner pressure P2 of the second chamber increase, and the inner pressure P1 of the first chamber decreases, the flow resistance R decreases according to (Equation 2), and thus the valve opening degree D increases as shown in FIG. 8. However, as the valve opening degree D increases, a contraction amount x of the biasing members 231*a* and 231*b* increases and also a force in the −X direction that the valve 237 and the pressure-receiving plate 232 receive from the biasing members 231*a* and 231*b* increases. As a result, the inner pressure P2 of the second chamber 236 instantly drops according to (Equation 1).

In contrast, in a case where the flow rate Q to the pressure reducing regulator H decreases, a phenomenon opposite to the above occurs instantly. That is, providing the above-described pressure reducing regulator H allows a flow pressure of the ink supplied to a member downstream of the pressure reducing regulator H to be kept within a desired range.

At this time, based on (Equation 1), a range of P2 is equal to a value obtained by multiplying a range of P1 by (Sv/Sd). In the present embodiment, therefore, (Sv/Sd), i.e., a ratio between a pressure-receiving area in the pressure-receiving portion and a pressure-receiving area in the valve, is designed to be sufficiently small, so that the range of P2 is minimized and a flow pressure downstream of the negative pressure control unit H is kept within a desired range.

Note that in the above description, the two coiled biasing members 231*a* and 231*b* are used as coupled springs, but the number of biasing members is not limited to this. As long as a desired negative pressure value can be obtained, the number of springs may be one, or three or more coupled springs may be used. Furthermore, instead of the coiled spring, a plate spring may be used. However, as in the present embodiment, if the biasing member 231*a* directly acting on the pressure-receiving plate 232 is prepared separately from the biasing member 231*b* acting on the valve 237, the pressure-receiving plate 232 may be biased in the −X direction even if the pressure-receiving plate 232 is separated from the shaft 234. In this case, even in the event that bubbles grow inside the print head 3 that is not driven for a long period of time, the second chamber 236 functions as a buffer so as to maintain the inner pressure of the print head 3 within a predetermined range.

Hereinafter, regarding the internal configuration of the back pressure regulator L of the present embodiment, specifically, a feature that is different from the pressure reducing regulator H, will be described. In FIG. 7C, the left part shows the pressure reducing regulator, which has been described with reference to FIG. 7B, and the right part shows the back pressure regulator L. In the back pressure regulator L, the valve 237 is provided for the second chamber 236, and the first chamber 235 is in the downstream side and the second chamber 236 is in the upstream side. To an end of the shaft 234 penetrating the first chamber through the orifice 238, a shaft holder 239 for receiving a biasing force from the biasing member 231*b* is attached. The pressure-receiving plate 232 of the back pressure regulator L is fixed to the shaft 234, and the pressure-receiving plate 232, the shaft 234, and the valve 237 always move integrally. That is, the pressure-receiving plate 232 of the back pressure regulator L receives a biasing force from both of the biasing member 231*a* and the biasing member 231*b*.

A pressure adjustment mechanism of the back pressure regulator L is substantially the same as that of the pressure reducing regulator H except that the relation between the first chamber 235 and the second chamber 236 is reversed. That is, in a case where a liquid flows into the second chamber 236 and an inner pressure exceeds a set pressure, the pressure-receiving plate 232 moves in the +X direction against the atmospheric pressure, separating the valve 237 from the orifice 238, thereby opening the orifice 238. The opening causes ink to flow from the second chamber 236 to the first chamber 235, and in a case where an inner pressure of the second chamber 236 is lower than a set pressure, the valve 237 comes into contact with the orifice 238, thereby closing the orifice 238. In this manner, in the negative pressure control unit 230 of the present embodiment, the pressure reducing regulator H and the back pressure regulator L which have substantially the same type are arranged in parallel in the same body member 250 to form the negative pressure control unit 230 corresponding to one color.

In the above-described ink circulation system of the present embodiment, different colors of inks are led to the same element substrate 10 through individual flow paths, and then the inks are ejected. This ink circulation system is characterized in that the flow paths are formed such that all colors of inks have an equal flow path resistance. More specifically, the flow paths are formed to have substantially the same shape throughout the circulation flow path shown in FIG. 3 including the laminated flow path member 210, the filter unit 220, and the negative pressure control unit, so that a difference in flow resistance due to a difference in shape of the flow path or a head difference does not occur.

In the laminated flow path member 210, in particular, the common supply flow path 211 for cyan and the common supply flow path 211 for black are formed to have a congruent shape on the same bottom surface of the same first flow path member 70, and the filter 221 and flow path groove 223 for cyan and the filter 221 and flow path groove 223 for black are formed to have a congruent shape on the same top surface of the same third flow path member 50. Accordingly, the two colors of inks are led through the flow paths having the same shape under the same head pressure, and thus, a pressure difference before and after passing through the laminated flow path member is the same as well. As for the filter unit 220 as well, the common supply flow path 211 for cyan and the common supply flow path 211 for black are formed to have a congruent shape on the same surface of the same intermediate layer portion 2202 and to have an equal flow path resistance.

Therefore, in the ink circulation system of the present embodiment, black ink and cyan ink can be handled equally, and pressure adjustment and ejection control in the negative pressure control unit 230 do not need to vary between the black ink and the cyan ink. As a result, the same type of negative pressure control unit can be used for the cyan ink and the black ink, allowing reduction of component costs and, in turn, production costs.

Note that a description has been given of the example of the print head 3 that ejects black ink and cyan ink by one element substrate 10. However, as a matter of course, the types of inks handled by the element substrate 10 is not limited to this. The element substrate may handle combinations of other color inks such as magenta ink and yellow ink or the element substrate may handle inks in the same color phase having different color material concentrations such as black ink and gray ink. In the former case, by preparing both the print head 3 handling black ink and cyan ink and the print head 3 handling magenta ink and yellow ink, for example, the printing apparatus for printing full color images can be achieved.

Second Embodiment

Also in the present embodiment, like the first embodiment, a print head 3 having a liquid ejecting unit 300, a filter unit 220, and a negative pressure control unit 230 is used. However, while the element substrate 10 in the first embodiment has the aspect of ejecting two colors of inks, cyan and black, an element substrate 10 according to the present embodiment ejects four colors of inks: cyan, magenta, yellow, and black.

Therefore, four negative pressure control units 230 corresponding to the respective colors are mounted on the filter unit 220 shown in FIG. 1A, and four ejection port arrays are arranged in parallel to each other in the X direction on each of the element substrates 10 shown in FIG. 2. Furthermore, as for the filter unit 220 shown in FIGS. 5A to 5G, flow paths and openings having the same shapes as those shown in FIGS. 5A to 5G are provided, but flow paths and openings are prepared in each layer in a manner corresponding to the number of colors of inks. Note that like the ink circulation system shown in FIG. 3 and the negative pressure control unit 230 shown in FIGS. 7A to 7C, the configuration prepared individually for each color is the same as that in the first embodiment.

Figure 9A:
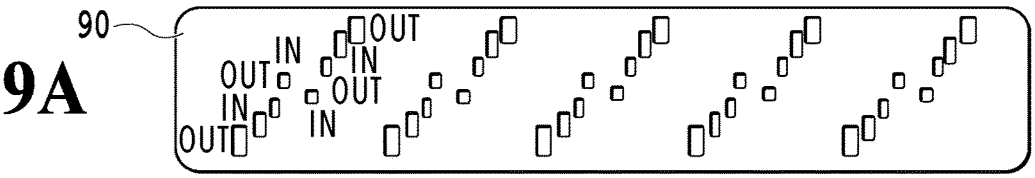
FIGS. 9A to 9I are diagrams showing details of a laminated flow path member used in a second embodiment.
Figure 9B:
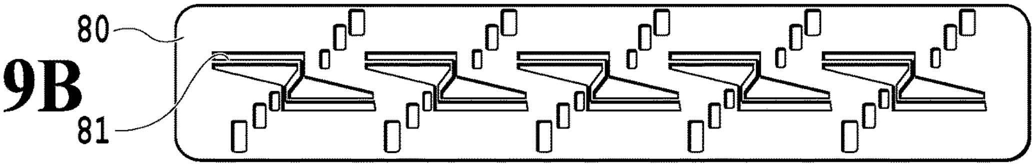
Figure 9C:
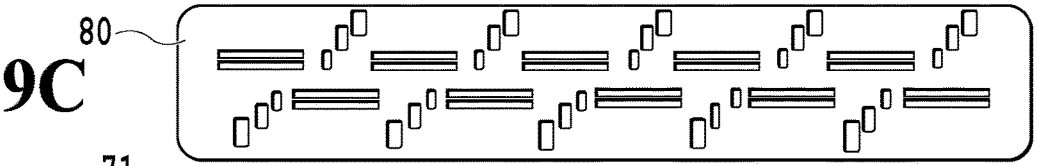
Figure 9D:
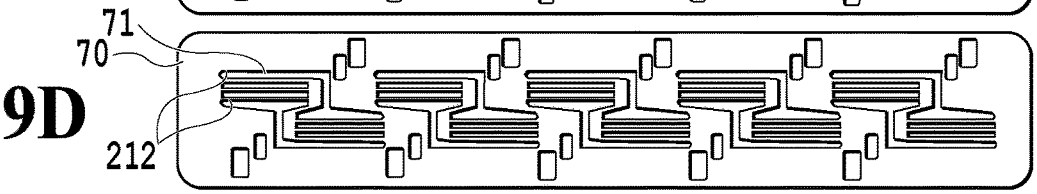
Figure 9E:
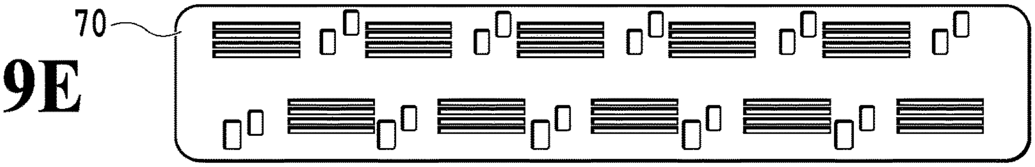
Figure 9F:
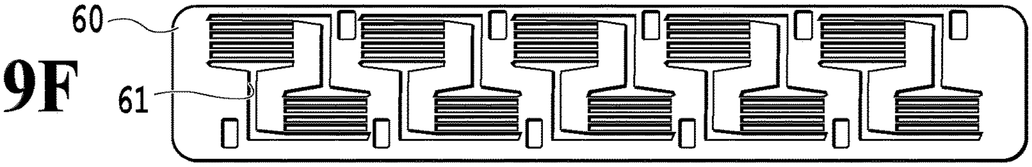
Figure 9G:
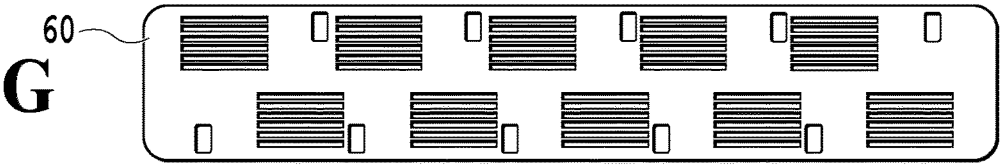
Figure 9H:
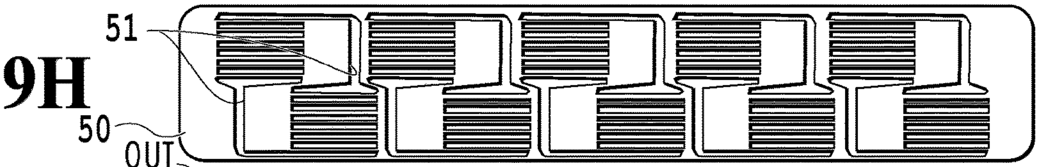
Figure 9I:
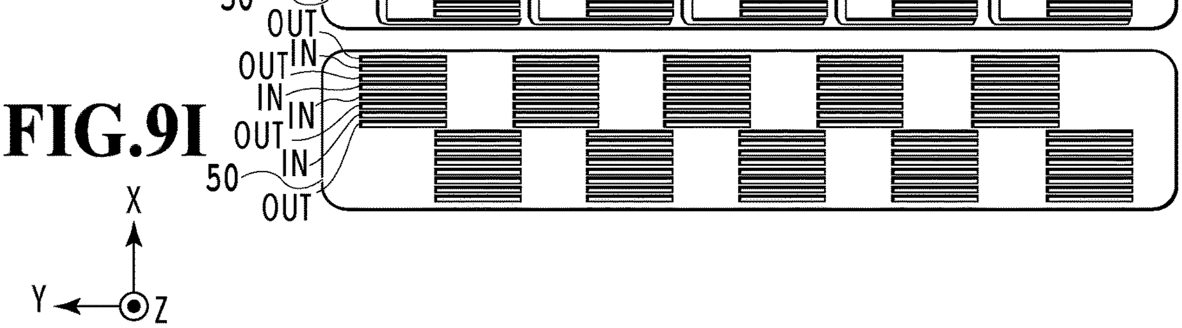

FIGS. 9A to 9I are diagrams showing details of a laminated flow path member 210 of the present embodiment. The laminated flow path member 210 of the present embodiment is formed by laminating five layers: a first layer to a fifth layer. FIG. 9A is a top view of a fifth flow path member 90. FIG. 9B is a top view of a fourth flow path member 80 and FIG. 9C is a perspective view of a bottom surface of the fourth flow path member 80 as viewed from the top. FIG. 9D is a top view of a third flow path member 70 and FIG. 9E is a perspective view of a bottom surface of the third flow path member 70 as viewed from the top. FIG. 9F is a top view of a second flow path member 60 and FIG. 9G is a perspective view of a bottom surface of the second flow path member 60 as viewed from the top. FIG. 9H is a top view of a first flow path member 50 and FIG. 9I is a perspective view of a bottom surface of the first flow path member 50 as viewed from the top. As for the fifth flow path member 90, only a flow path port penetrating from a top surface to a bottom surface is formed, and the top surface and the bottom surface have the same shape, and therefore only the top view is shown. All of the members extend in the Y direction and ten element substrates 10 for four colors cover the arrangement area.

The fifth flow path member 90 shown in FIG. 9A is a surface which comes into contact with the filter unit 220. A flow inlet (In) that receives ink from the filter unit 220 and a flow outlet (Out) that sends the ink to the filter unit 220 are formed for each color of ink in a manner corresponding to openings of the filter unit 220.

On the top surface of the fourth flow path member 80 as shown in FIG. 9B, there are formed first flow path grooves 81 extending in an area corresponding to two element substrates 10 for two colors of inks among four colors of inks. The two colors of inks among four colors of inks flowing from the flow inlets (In) on the top surface are led to the area corresponding to two element substrates 10. All of the first flow path grooves 81 have a congruent shape and have an equal flow path resistance in all of five positions arranged in the Y direction.

On the top surface of the third flow path member 70 as shown in FIG. 9D, there are formed second flow path grooves 71 extending in the area corresponding to two element substrates 10 for two colors of inks among four colors of inks. The second flow path groove 71 collects ink from the flow outlet (Out) corresponding to the two element substrates 10 formed on the bottom surface. The collected ink is led to a collection port (Out) of the fifth flow path member 90 via the fourth flow path member 80. All of the second flow path grooves 71 also have a congruent shape and have an equal flow path resistance like the first flow path grooves 81.

On the top surface of the second flow path member 60 as shown in FIG. 9F, there are formed third flow path grooves 61 for leading, to the area corresponding to two element substrates 10, the remaining two colors of inks that have not been led to the area corresponding to two element substrates 10 by the first flow path grooves 81 among four colors of inks. All of the third flow path grooves 61 also have a congruent shape and have an equal flow path resistance in all of five positions arranged in the Y direction.

On the top surface of the first flow path member 50 as shown in FIG. 9H, there are formed fourth flow path grooves 51 for collecting, from the area corresponding to two element substrates 10, the remaining two colors of inks that have not been collected from the area corresponding to two element substrates 10 by the second flow path grooves 71 among four colors of inks. The fourth flow path groove 51 collects ink received from the flow outlet (Out) corresponding to two element substrates 10 formed on the bottom surface. The collected ink is led to a collection port (Out) of the fifth flow path member 90 via the second flow path member 60, the third flow path member 70, and the fourth flow path member 80. All of the fourth flow path grooves 51 also have a congruent shape and have an equal flow path resistance.

That is, two colors of inks among four colors of inks supplied from the filter unit 220 are led in the X and Y directions to the area corresponding to two element substrates 10 by the first flow path grooves 81 formed on the fourth flow path member 80. Then, in an area other than the top surface of the fourth flow path member 80, the two colors of inks travel vertically downward (−Z) to the individual flow path member 30.

The remaining two colors of inks among four colors of inks are led in the X and Y directions to the area corresponding to two element substrates 10 by the third flow path grooves 61 formed on the second flow path member 60. Then, in an area other than the top surface of the second flow path member 60, the remaining two colors of inks travel vertically downward (−Z) to the individual flow path member 30.

Furthermore, the remaining two colors of inks among four colors of inks collected by the individual flow path member 30 are collected on X and Y planes from the area corresponding to the two element substrates 10 by the second flow path grooves 71 formed on the third flow path member 70. Then, in an area other than the top surface of the third flow path member 70, the remaining two colors of inks travel vertically upward (+Z) to the filter unit 220.

The remaining two colors of inks among four colors of inks are collected on the X and Y planes from the area corresponding to two element substrates 10 by the fourth flow path grooves 51 formed on the first flow path member 50. Then, in an area other than the top surface of the first flow path member 50, the remaining two colors of inks travel vertically upward (+Z) to the filter unit 220.

Figure 10:
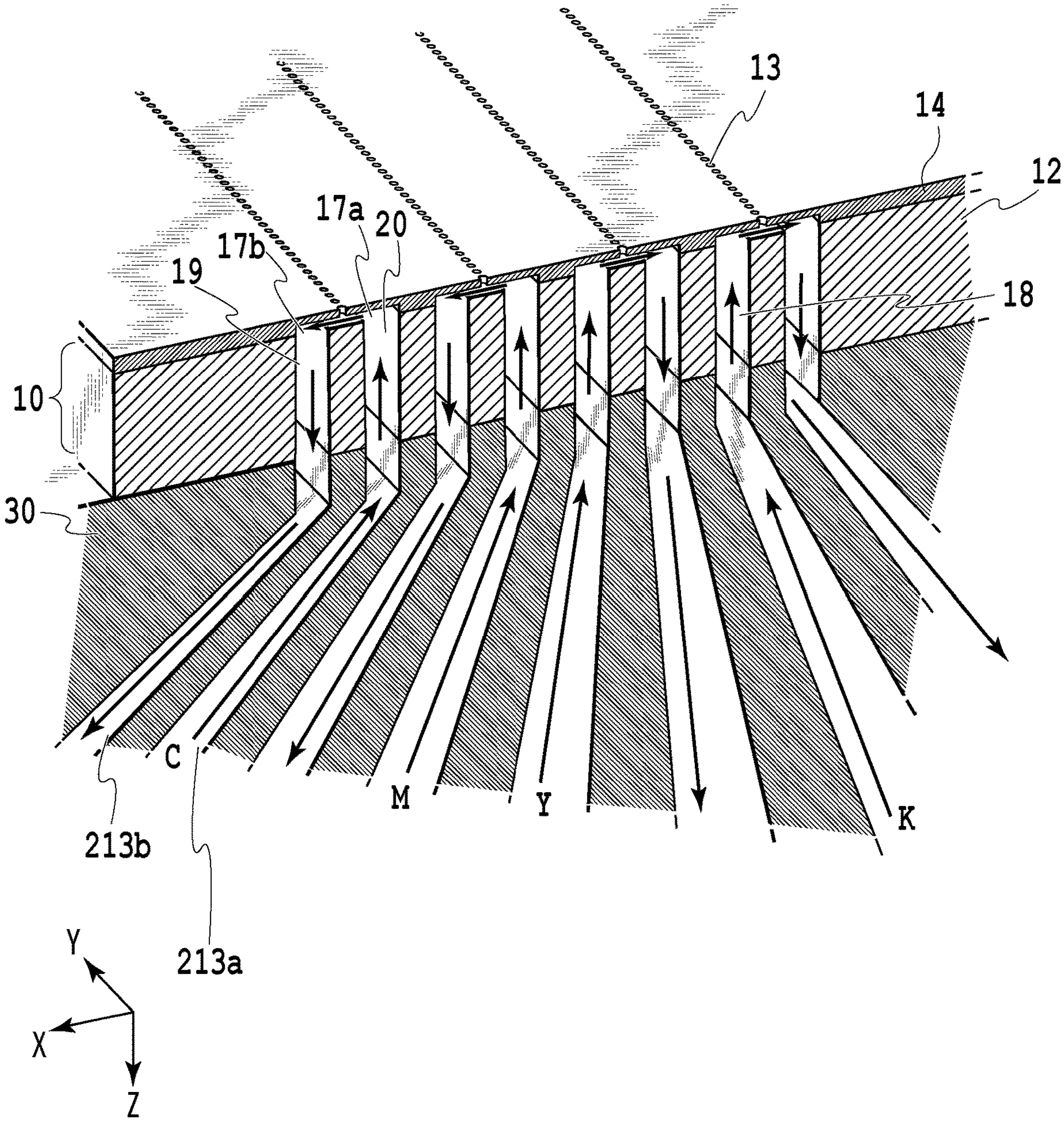
FIG. 10 is a cross-sectional view of a structure of an element substrate and a connection state of an individual flow path member.

FIG. 10 is a cross-sectional view of a structure of the element substrate 10 and a connection state of the individual flow path member 30 in the present embodiment. A difference from FIG. 6 is that flow paths for ejection port arrays corresponding to four colors are formed. Also in the present embodiment, a substrate supply path 18 and a substrate collection path 19 are axisymmetric in the X direction, and an individual supply flow path 213*a* and an individual collection flow path 213*b* are axisymmetric in the X direction. More specifically, in order of decreasing distance from a center line, the substrate supply path 18 and the substrate collection path 19, and the individual supply flow path 213*a* and the individual collection flow path 213*b*, for four colors are arranged to form supply (In), collection (Out), supply (In), and collection (Out). Therefore, a flow path of ink heated on the element substrate 10 to a high temperature is located in an outer position where heat dissipation is high or lies between flow paths of ink having a relatively low temperature before being heated on the element substrate 10. As a result, heat exchange takes place between adjacent flow paths, allowing the temperature of ink flowing through the element substrate 10 to be kept within a predetermined range.

Also in the above-described ink circulation system of the present embodiment, the flow paths for the respective colors are formed to have an equal flow path resistance. More specifically, the flow paths are formed to have substantially the same shape throughout the circulation flow path shown in FIG. 3 including the laminated flow path member 210, the filter unit 220, and the negative pressure control unit, so that a difference in flow resistance due to a difference in shape of the flow path or a head difference does not occur.

Therefore, black, cyan, yellow, and magenta inks can be handled equally, and pressure adjustment in the negative pressure control unit 230 does not need to vary among the black, cyan, yellow, and magenta inks. As a result, the same type of negative pressure control unit can be used for all inks, allowing reduction of component costs and, in turn, production costs.

Figure 11:
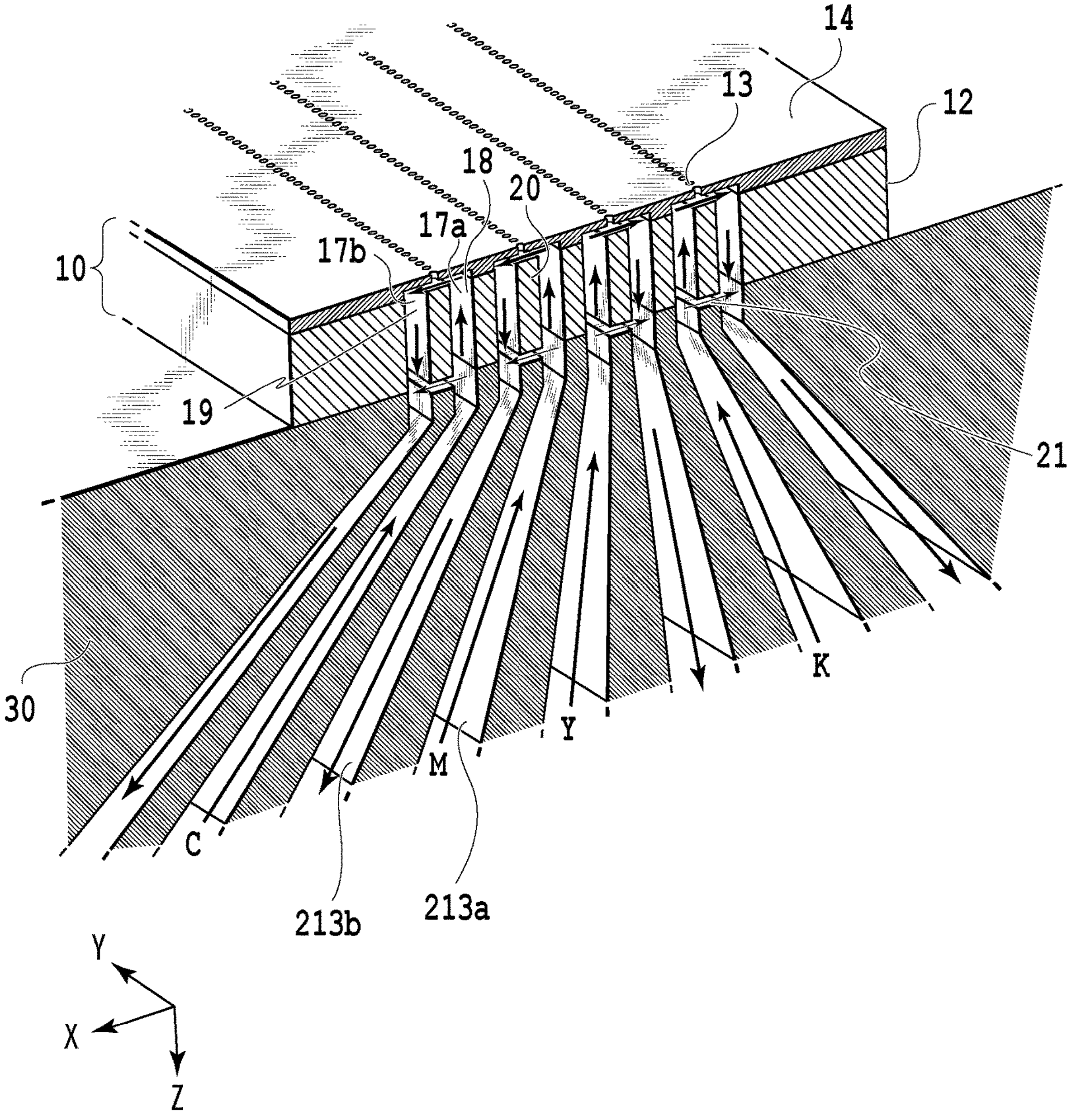
FIG. 11 is a view showing another configuration of the individual flow path member.

FIG. 11 is a view showing another configuration of the individual flow path member 30 that can be used in the second embodiment. A difference from FIG. 10 is that an end of a flow path wall between the individual supply flow path 213*a* and the individual collection flow path 213*b* for each color is located below a mounting surface of the element substrate 10 with respect to the individual flow path member 30 (i.e., in a position displaced in the +Z direction). This configuration produces a second flow path 21 from the individual supply flow path 213*a* to the individual collection flow path 213*b*, urging a flow that does not pass through an element individual flow path 20, which is a first flow path. Then, in a case where a distance from the mounting surface to the end of the flow path wall is greater than a height of the element individual flow path 20 in the Z direction, it is possible to efficiently cool the element substrate 10 without loads on the element individual flow path 20.

Incidentally, in a case where the element substrate 10 has a high ejection frequency, a refill force of each ejection port may sometimes cause ink in the individual collection flow path 213*b* to back flow against an ink collection force of the individual collection flow path 213*b*. However, in the case of using the back pressure regulator L as in the present embodiment, the back flow cannot occur due to its internal structure. Accordingly, a negative pressure in the individual collection flow path 213*b* rapidly increases, which may cause a malfunction in ejecting operation.

However, if the second flow path 21 as shown in FIG. 11 is prepared and a negative pressure force of the back pressure regulator L is adjusted with the second flow path 21 provided, it is possible to set a flow rate of ink collected by the individual collection flow path 213*b* sufficiently higher than a refill amount in the ejection port. As a result, stable ejecting operation can be maintained irrespective of the ejection frequency, that is, a print duty, in the element substrate 10.

It should be noted that FIG. 11 shows the aspect of providing the second flow path 21 for all of four colors, but the second flow path 21 may be provided only for specific part of ejection port arrays in a case where there is a certain tendency in the temperature distribution in the element substrate 10 or the ejection frequency in each ejection port array.

OTHER EMBODIMENTS

In the above description, a system is employed in which the electrothermal transducer (heater) is used as an energy generating element for liquid ejection, and by applying a voltage pulse across the electrothermal transducer, ink is ejected. However, the present invention is not limited to this aspect. For instance, a piezoelectric element may be provided in a manner corresponding to each ejection port and a voltage may be applied across the piezoelectric element in accordance with ejection data, thereby ejecting ink as a droplet according to a change in its volume.

Incidentally, the present invention does not always need to employ the ink circulation system as described with reference to FIG. 3. For instance, a supply ink tank and a collection ink tank may be provided upstream and downstream of a print head, respectively, and of the ink supplied from the supply ink tank to the print head, ink that has not been consumed in ejecting operation may be collected by the collection ink tank.

Furthermore, the shape of the element substrate 10 and the layout of the print head should not be limited to the aspect shown in FIG. 2. For example, element substrates of parallelograms or trapezoids may be arranged in the Y direction to form one row. Needless to say, the number of colors of inks that can be handled in each element substrate is not limited to two or four. In either case, as long as a stacked flow path member for obtaining an equal flow path resistance for different types of inks is prepared, it is possible to produce an effect of the present invention that all colors of inks have an equal flow path resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a divisional of U.S. Patent Application Ser. No. 16/857,795, filed Apr. 24, 2020, now U.S. Pat. No. 11,376,863, which is a divisional of U.S. patent application Ser. No. 15/976,470, filed May 10, 2018, now U.S. Pat. No. 10,668,736, which claims the benefit of Japanese Patent Application No. 2017-127799, filed Jun. 29, 2017, which is hereby incorporated by reference herein in its entirety.

What is claimed is:

1. A liquid ejecting head comprising ejection ports and a flow path member having flow paths for circulating a liquid between inside of the liquid ejecting head and outside of the liquid ejecting head, wherein the flow path member is formed by laminating a plurality of layers including a first layer and a second layer, the first layer is provided with a supply port for supplying a liquid to the flow paths and a collection port for collecting the liquid from the flow paths, the second layer is provided with the flow paths including a plurality of supply flow paths for leading the liquid supplied from the supply port to a plurality of the ejection ports and a plurality of collection flow paths for leading the liquid supplied from the plurality of the supply flow paths to the collection port, in the second layer, the number of the supply flow paths is greater than the number of the collection flow paths, and the liquid ejecting head further comprises at least one filter configured to filter a liquid to be supplied to the plurality of the supply flow paths, and the number of the filters is less than the number of the supply flow paths in the second layer.

2. The liquid ejecting head according to claim 1, further comprising an ejection port array in which a plurality of the ejection ports are arrayed in a predetermined direction, wherein in the second layer, at least two of the supply flow paths are adjacent to each other in a direction crossing the predetermined direction.

3. The liquid ejecting head according to claim 2, wherein in the second layer, each of the supply flow paths extends in the predetermined direction.

4. The liquid ejecting head according to claim 3, wherein in the second layer, the plurality of collection flow paths each extend in the predetermined direction.

5. The liquid ejecting head according to claim 4, wherein in the second layer, the plurality of supply flow paths are arranged in the predetermined direction over a region where a plurality of ejection port arrays are arranged.

6. The liquid ejecting head according to claim 5, wherein in the second layer, the supply flow paths and the collection flow paths are arranged so as to have an overlapping region when viewed in the direction crossing the predetermined direction.

7. The liquid ejecting head according to claim 6, wherein the number of layers is at least eight.

8. The liquid ejecting head according to claim 7, wherein in the second layer, the width, in the direction crossing the predetermined direction, of at least one of the supply flow paths is shorter than the width, in the direction crossing the predetermined direction, of at least one of the collection flow paths.

9. A liquid ejecting apparatus comprising the liquid ejecting head according to claim 1 and a pump configured to circulate a liquid between inside of the liquid ejecting head and outside of the liquid ejecting head.

10. A liquid ejecting head comprising ejection ports and a flow path member having flow paths for circulating a liquid between inside of the liquid ejecting head and outside of the liquid ejecting head, wherein the flow path member is formed by laminating a plurality of layers including a first layer, a second layer, and a third layer, the first layer is provided with a supply port for supplying a liquid to the flow paths and a collection port for collecting the liquid from the flow paths, the second layer is provided with the flow paths including at least two supply flow paths for leading the liquid supplied from the supply port to the plurality of ejection ports and at least one collection flow path for leading the liquid supplied from the supply flow paths to the collection port, the third layer is provided with at least one filter configured to filter a liquid to be supplied to the supply flow paths, in the second layer, the number of the supply flow paths is greater than the number of the collection flow paths, at least two of the supply flow paths are adjacent to each other in a direction crossing a predetermined direction in which a plurality of the ejection ports are arrayed, the supply flow paths and the collection flow paths are arranged so as to have an overlapping region when viewed in a direction crossing the predetermined direction, the supply flow paths are arranged in the predetermined direction over a region where a plurality of ejection port arrays are arranged, and the number of the filters in the third layer is less than the number of the supply flow paths in the second layer.

11. A liquid ejecting apparatus comprising the liquid ejecting head according to claim 10 and a pump configured to circulate a liquid between inside of the liquid ejecting head and outside of the liquid ejecting head.

* * * * *